June 30, 1953  H. D. WILLIAMS  2,644,062
SWITCH
Filed Oct. 31, 1950
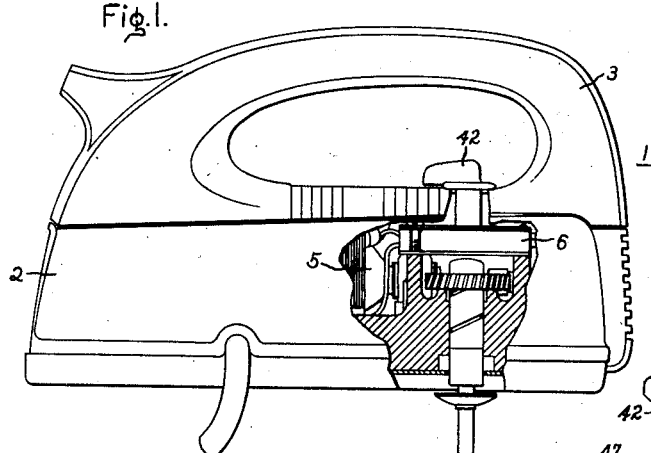
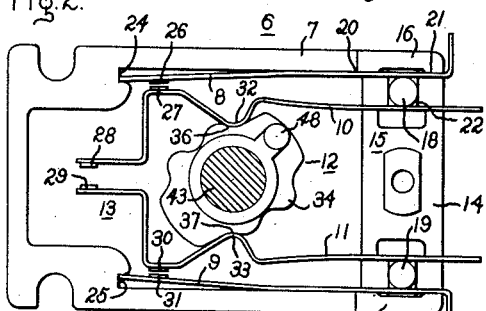
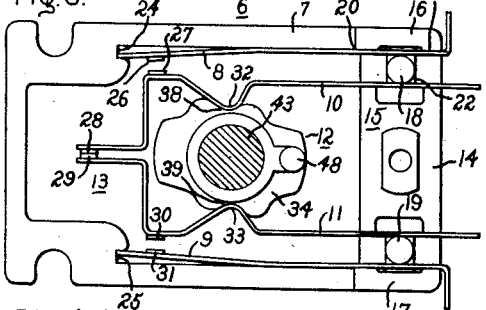
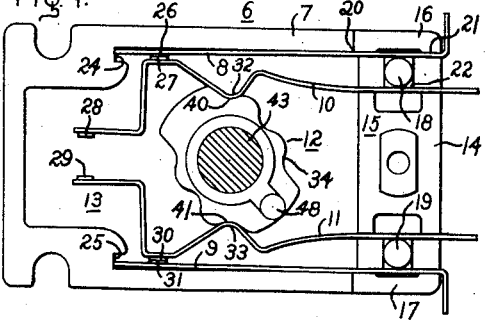
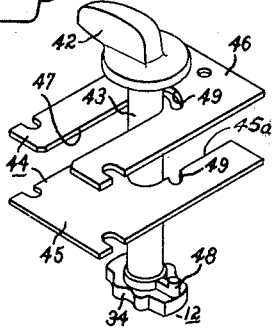
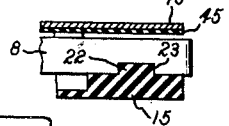
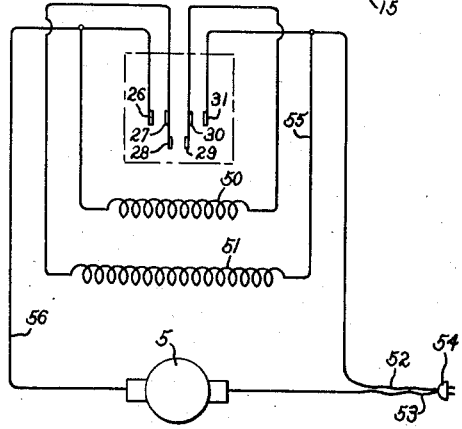
Inventor:
Herbert D. Williams,
by
His Attorney.

Patented June 30, 1953

2,644,062

UNITED STATES PATENT OFFICE 2,644,062

SWITCH

Herbert D. Williams, Monroe, Conn., assignor to General Electric Company, a corporation of New York Application October 31, 1950, Serial No. 193,069

3 Claims. (Cl. 200—165)

This invention relates to a switch for a household appliance such as, for example, a mixer and, more particularly, to a new and improved switch structure.

The primary object of the invention is to provide an improved switch which is simple in structure, small in size, especially as to its thickness, and capable of being manufactured and assembled at low cost. A switch embodying my invention, because of its small size, is well adapted for being built into a kitchen food mixer to control the motor of the mixer and it is this application of my invention which I have elected to illustrate and describe. It is to be understood, however, that this is only by way of example and that the switch may be used wherever found applicable.

Further objects and advantages of this invention will become apparent and the invention will be more clearly understood from the following description referring to the accompanying drawing and the features of novelty which characterize this invention will be pointed out with particularity in the claims annexed to and forming a part of this specification.

Broadly, this invention comprises the provision of a housing for enclosing three sets of contacts which are engageable to connect the field of a motor either in series or in parallel to regulate the speed of the motor. The switch is maintained as thin as possible and a combination cam and handle is provided for the operation of the contacts within the switch to give the various required speeds in the operation of the appliance motor.

In the drawing, Fig. 1 is a side elevation partially cut away to show the position of the switch in a household mixer; Figs. 2, 3 and 4 are elevation views showing the switch contacts in the off, high speed and low speed positions respectively; Fig. 5 is a schematic wiring diagram of the mixer switch; Fig. 6 is a detail sectional view through an end of the switch; and Fig. 7 is an exploded perspective view of certain parts of the switch structure.

Referring to the drawing, a mixer 1 is shown comprising a body portion 2, a handle 3, and a plurality of beater elements 4. A motor 5 and a switch 6 for controlling its speed are shown positioned within the body portion 2.

The switch 6 comprises a casing 7, a pair of outer spring arms 8, 9, a pair of inner spring arms 10, 11 and a combination handle and cam 12 for controlling the positioning of the inner spring arms or elements.

Casing 7 is a substantially hollow shell structure preferably made of an insulating material such as Bakelite to define a cavity 13 for housing the spring arms. Each of the spring arms extends through an end 14 of the casing 7. At this end 14 of the switch the spring arms are spaced apart in parallel juxtaposition.

End 14 of the switch casing provides a wall for enclosing one end of the cavity 13. Specifically, a central H-shaped section 15 is provided to act in conjunction with the outer walls 16, 17 and a pair of raised cylindrical pins 18, 19 to position the spring contact arms. For example, wall 16 and pin 18 define a channel for the positioning of spring contact arm 8; the H section 15 and pin 18 define a channel for the positioning of spring contact arm 10; the H section 15 and pin 19 define a channel for the positioning of spring arm 11; while the wall 17 and pin 19 define a channel for the positioning of spring arm 9.

The structure defining each of these channels provides three point suspension for the contact arm positioned therein. For example, the channel defined by wall 16 and pin 18 does not have a straight through width as great as the thickness of the spring contact arm 8. Consequently, the latter must be deflected around the pin 18. The contact at the pin 18 and at the protruding portions 20, 21 on the wall 16 provides the three point suspension. Consequently, no other securing device is required for the positioning of the spring arms in the housing.

To insure the axial alignment of the contact arms and to prevent any substantial axial movement thereof, raised bosses 22 (Fig. 6) are provided at end 14 of the switch substantially in alignment with the cylindrical pins 18, 19. A notch such as that shown at 23 is provided in each of the contact arms to engage the complementary boss 22. The inter-engagement of the notches 23 and the bosses 22 serves to hold the contact arms against axial movement.

In the manner above described, each of the spring elements is securely held to provide for their suspension within the switch housing and furthermore the opposite ends of the outer elements 8 and 9 are engaged in notches 24 and 25 respectively in the casing 7 to preload the spring elements. By this is meant that spring elements 8 and 9 have a greater length from notches 23 to their inner ends than the distance between the bosses 22 and the ends of the notches 24 and 25. Consequently, some deflection of the spring elements is required in order to position them in the allotted space. This preloading or stressing of the springs 8 and 9 serves to increase the contact pressure when cooperating contacts are moved into engagement with them.

Spring element 8 at a point intermediate its ends is provided with a contact 26 which preferably would be made of one of the rare metals such as platinum to prevent oxidation and corrosion and to insure good electrical contact. Cooperating spring arm 10 is provided with a registering contact 27 and a second contact 28 adjacent its outer extremity. Spring member 11 has a contact 29 engageable with contact 28 and a contact 30 engageable with a contact 31 which is positioned on the spring element 9. The electrical combination of these contacts with one another connects the field of the motor in parallel or in series to vary its speed or to disengage it as shown in Fig. 2 when none of the contacts are in engagement.

For the operation of the contacts, the inner spring elements 10, 11 are provided with a pair of indented portions 32 and 33 respectively which are deflected from the main axis of the elements toward one another. The indented portions 32, 33 provide a surface engageable by a cam 34 to effect the operation of the switch arms 10, 11 into and out of engagement with one another and with the outer elements 8 and 9.

Cam 34 is provided with three sets of oppositely disposed surfaces with each set being equidistant from the center 35 of the cam. For example, one set of corresponding surfaces are shown in Fig. 2 as surfaces 36, 37 which are in engagement with the indented portions 32 and 33 respectively to prevent contact between any of the electrical contacts. The second group of these complementary surfaces are shown as 38 and 39 in Fig. 3 wherein the contacts 28 and 29 are in engagement while the contacts 26 and 27 and 30, 31 are out of engagement. This connection provides for the series engagement of the motor field.

In Fig. 4, on the other hand, surfaces 40 and 41 are provided to engage the indented portions 32 and 33 to connect the outer contacts 26, 27 and 30, 31 together to provide for the parallel connection of the field winding of the motor.

With this switch structure it is a simple matter to select the off, series, and parallel connections for the motor windings and thereby regulate the motor speed.

Of further importance is the combination of the plastic handle and cam 12 for operating the switch. Specifically, the handle 42 and cam 34 are cast as a unit with the cam formed in one plane and the handle portion formed in another with a shaft 43 connecting the two. To secure the handle and cam within the switch an interesting structure is used. Specifically, it is obvious that an insulating strip is required to shield the surface of the switch elements 8, 9, 10 and 11. In view of this requirement, a top cover 44 is made of an insulating shield 45 such as Bakelite and is provided with a longitudinal slit 45a that extends axially from one end a predetermined distance to a point where it partially surrounds the shaft 43. A second cover plate 46 as a part of cover 44 is provided with a slit 47 that is similar to the slit 45a whereby when the covers are superimposed, the two slits are covered, and only a central opening in the cover 44 is left for the protrusion of the shaft 43. In this manner, when the cover 44 is secured to the switch housing 7, the handle and cam are fastened in place. It is obvious that this makes for a simplified installation of the cam within the switch since no set screws or the like are required for positioning the handle on the shaft.

Of further importance is the fact that the handle cam combination 12 carries a stop 48, which is a circular upwardly extending pin engageable with a registering slot 49 formed in the cover 44. Slot 49 is so positioned as to prevent the rotation of the cam 34 to a position that would permanently deform any of the spring contact arms. The stop for this assures the proper positioning of the switch handle for a predetermined motor speed.

The schematic wiring diagram shown in Fig. 5 is an indication of the functional operation of the switch. In this figure, switch 6 is bounded by a dotted line and the contacts are enclosed within the dotted line to correspond to those shown in Figs. 2, 3 and 4. In addition, a pair of motor fields 50, 51 are shown for the motor 3 and a pair of leads 52, 53 are shown continuing from a male plug 54. The wiring diagram shown in Fig. 5 is the schematic diagram for that position of the switch shown in Fig. 2, i. e., with all the contacts open.

If the cam were in the position shown in Fig. 3, then the contacts 28 and 29 would be closed and current would be conducted from lead 52 through the field 51, through contact 28 to contact 29, then through the field 50, through the motor 5, and back to lead 53.

If the position of the switch were such as that shown in Fig. 4, then the contacts 26 and 27 would be closed; the contacts 30, 31 would be closed; and the contacts 28, 29 would be open. Under these circumstances, current would pass from the plug 54 into lead 52 and then the current would pass from contact 31, through contact 30, to field 50. At the same time current would pass through branch line 55 to field 51 to provide for the connection of corresponding ends of fields 50 and 51. After passing through the fields in parallel, the current would pass from field 51 to contact 27 and through contact 26 to meet the corresponding end of field 50 whereupon both fields will be connected through branch 56 to the motor 5 and out through lead 53 to the plug 54.

With the structure of this switch as shown, a need in the art for a thin, wafer-like, easily secured and assembled switch has been satisfied which is simple to manufacture and certain in operation.

Modifications of this invention will occur to those skilled in the art, and it is desired to be understood, therefore, that this invention is not limited to the particular embodiment disclosed but that it is intended to cover all modifications which are within the true spirit and scope of this invention.

What I claim as new and desire to secure by Letters Patent of the United States is:

1. A switch for an electrical appliance comprising an insulating body member housing a plurality of spring contact arms to form an inner and an outer pair, said outer arms each having a contact intermediate its ends, each of said inner arms having a contact registerable with said outer contact respectively, each of said inner arms further having a contact positioned at its outer extremity, means for moving said inner contact arms to provide engagement between said electrical contacts, said moving means comprising an integral handle, cam and connecting shaft with said cam having pairs of oppositely disposed surfaces with the surfaces of each pair having a different radius, a cover engageable with said body portion to enclose said cam and said spring contact arms, said cover comprising a pair of strips, each of said strips having a longitudinal slot, said slots having a width adapted to surround said cam shaft whereupon said handle extends out from said switch while said switch arms and said cam are enclosed when said strips are superimposed and in engagement with said body member.

2. A switch for an electrical appliance comprising an insulating body member, a plurality of spring contact arms, means for securing said arms in said body member, and means for operating said contact arms, said securing means comprising for each of said contact arms a channel defined by a portion of said body member and a cylindrical pin positioned in said body member, said spring contact arms having a greater thickness and the straight through thickness of said channel necessitating the deflection of said arms for insertion into said channel thereby producing resilient engagement between said spring contact arm and said body member, said plurality of spring contact arms forming an inner and an outer pair, said outer arms each having a contact intermediate its ends, each of said inner arms having a contact registerable with its proximate outer contact element respectively, each of said inner arms further having a contact positioned at its outer extremity, said operating means comprising an integral cam and handle member positioned between said inner spring arms to provide movement thereto for inter-engaging said electrical contacts.

3. A switch for an electrical appliance comprising a body member having walls which define a contact cavity having an open top, a plurality of spring contact arms in said cavity, means for actuating said contact arms comprising a cam positioned in the cavity, a handle above the plane of the top surface of the body member and a shaft connecting the cam and handle, said cam, handle and shaft comprising an integral unitary structure, and a cover for the open top of the body member comprising a pair of superimposed strips, each of said strips having a longitudinal slot of a width to surround said shaft whereby said cover may be assembled on the body member by inserting the two strips over the top of the body member from opposite ends of the body member to position them in superimposed relation beneath the handle with the shaft projecting through adjacent inner ends of said slots.

HERBERT D. WILLIAMS.

References Cited in the file of this patent

UNITED STATES PATENTS

| Number | Name | Date |
|---|---|---|
| 2,292,179 | Tubbs | Aug. 4, 1942 |

FOREIGN PATENTS

| Number | Country | Date |
|---|---|---|
| 639,333 | Germany | Dec. 3, 1936 |